United States Patent [19]

Nielinger et al.

[11] 4,035,438

[45] July 12, 1977

[54] IMPACT RESISTANT POLYMER MIXTURES

[75] Inventors: Werner Nielinger; Rolf Dhein; Kurt Schneider; Peter Tacke, all of Krefeld, Germany

[73] Assignee: Bayer Aktiengesellschaft, Leverkusen, Germany

[21] Appl. No.: 581,753

[22] Filed: May 29, 1975

[30] Foreign Application Priority Data

June 1, 1974  Germany .......................... 2426671

[51] Int. Cl.$^2$ ......................................... C08L 77/02
[52] U.S. Cl. .............................................. 260/857 G
[58] Field of Search ..... 260/857 G, 857 L, 857 TW

[56] References Cited

U.S. PATENT DOCUMENTS

| | | | |
|---|---|---|---|
| 3,373,223 | 3/1968 | Armstrong | 260/857 L |
| 3,465,059 | 9/1969 | Seven | 260/857 L |
| 3,471,426 | 10/1969 | Hofton | 260/857 L |
| 3,539,664 | 11/1970 | Kray | 260/857 L |
| 3,634,543 | 1/1972 | Sherman | 260/857 L |
| 3,822,227 | 7/1974 | Hermann | 260/857 L |

FOREIGN PATENT DOCUMENTS 1,908,468  9/1970  Germany

*Primary Examiner*—Paul R. Michl
*Attorney, Agent, or Firm*—Plumley and Tyner

[57] ABSTRACT

Polymer mixtures consisting essentially of

A. a polyethylene with a melt index of above 15 g/10 min,

B. a graft polymer of an ethylene/(meth)acrylic acid copolymer as graft substrate and grafted polymerized units of ε-caprolactam, and C. a poly-ε-caprolactam.

6 Claims, No Drawings

IMPACT RESISTANT POLYMER MIXTURES

The present invention relates to polyamides with high impact strength.

It is already known that polyamides have a high impact strength when they have been conditioned. In order to increase the rather low impact strength of freshly moulded polyamide articles, it is therefore necessary to condition the polyamide articles by a complicated and time consuming storage in water.

Attempts have also been made to improve the impact strength of polyamides by mixing them with polyolefines. Such mixtures are prepared by homogenizing the components in an extruder under the action of high shearing forces, if desired with the addition of peroxides (Kunststoffe und Gummi 7 (1968) No. 8, page 275). Since mixtures of polyamides and polyolefines have a strong tendency to separate into their components, it has also been attempted to improve the miscibility of these two substances by the addition of copolymers of ethylene and comonomers which contain carboxyl groups, such as acrylic acid or methacrylic acid (Belgian Patent No. 641,952 and German Offenlegungsschrift No. 1,941,228) or the corresponding esters (German Offenlegungsschrift No. 1,669,702).

According to the teaching of German Offenlegungsschrift No 1,595,259, the impact strength of polyamides is improved by polymerising $\epsilon$-caprolactam in the presence of copolymers of ethylene and comonomers which contain carboxyl groups. Considerable difficulties arise, however, when this process is carried out on a commercial scale because satisfactory distribution of the copolymer in the lactam melt is achieved only by prolonged dispersion of the copolymer in the melt under the action of shearing forces at elevated temperature (German Offenlegungsschrift No. 1,720,244).

According to German Offenlegungsschrift No. 1,908,468, homogeneous mixtures with improved impact strength, elongation and good properties for processing are obtained when lactams are polymerised in the presence of polyethylene and copolymers of ethylene and acrylic acid. Polyethylenes with a molecular weight of at least 100,000 are used for this purpose. Products produced from these mixtures, however, have only a low notched impact strength and they have a high tendency to white fracture.

It has surprisingly been found that the disadvantages of these polymer alloys can be obviated by using polyethylenes with molecular weights below 100,000 and a melt index above 15, preferably 17 to 22 g/10 min (MFI 190/2,16 = melt flow index at at 2,16 kp and 190° C) determined according to DIN 53 735.

This invention therefore relates to impact resistant polymer mixtures consisting of A. 3 to 30 percent by weight of a polyethylene with a melt index of above 15 g/10 min,
B. a graft polymer of 0.3 to 5 percent by weight of a copolymer of ethylene and (meth)acrylic acid as graft substrate and grafted polymerised units of $\epsilon$-capro-lactam and
C. a poly-$\epsilon$-caprolactam, in which the quantities of grafted and ungrafted polycaprolactam are 65 to 96.7% by weight.

Particularly suitable polyethylenes are high pressure polyethylenes with a melt index above 15, preferably with a melt index of 17 to 22 g/10 min.

Suitable copolymers for use as graft substrates are those which contain 1 to 10 mol percent, preferably 2 to 5 mol percent, of (meth)acrylic acid, partly, preferably from 30 to 70% in the form of the sodium salt.

The preparation of the polymer mixtures according to the invention is preferably carried out by hydrolytic polymerisation of $\epsilon$-caprolactam in known manner with the addition of $\epsilon$-amino-caproic acid in the presence of the polyethylene and of the copolymer with stirring in a nitrogen atmosphere at temperatures between 180° and 300° C. Another possible method of preparing the polymer mixtures comprises homogenizing the polyethylene, copolymer and poly-$\epsilon$-caprolactam in a conventional double shaft extruder by known methods and then moulding the homogenized mixture. Alternatively, $\epsilon$-caprolactam may be polymerised in the presence of the copolymer and subsequently processed with the polyethylene, either directly or after passage through an extruder.

The polyamides according to the invention are subsequently moulded by known methods such as injection moulding or extrusion. To produce the moulded products, the polyamides may be mixed with fillers or reinforcing agents such as glass fibers or with UV absorbents or mould release agents. The inventive polymer mixtures are especially useful for the production of housing, plates, rolls or bristles.

EXAMPLE 1

6070 g of $\epsilon$-caprolactam, 522 g of $\epsilon$-aminocaproic acid, 1275 g (15% by weight, based on the total mixture) of a polyethylene with a melt index of 17 to 22 g/min (MFI 190/2,16) and 255 g (3% by weight, based on the total mixture) of a copolymer of ethylene and 4 mol % of acrylic acid which is partly in the form of its sodium salt are polycondensed by heating in an autoclave with stirring in a nitrogen atmosphere, first for 1 hour at 200° C and then for 7 hours at 270° C. The resulting melt is spun into water as a bristle and chopped. The granulate is extracted four times with water at 95° C, on each occasion for 3 hours, and dried in a vacuum at 110° C. The product has a relative solution viscosity of 3.2 determined on a 1% solution in m-cresol at 25° C in an Ubbelohde viscosimeter. Test samples prepared from this polyamide-polyolefine mixture have a notched impact strength of 21 kJ/m² according to DIN 53 735 determined without prior conditioning.

EXAMPLE 2

4530 g of $\epsilon$-caprolactam, 522 g of $\epsilon$-aminocaproic acid, 400 g (15% by weight) of polyethylene and 120 g (2% by weight) of ethylene/acrylic acid copolymer are polycondensed as described in Example 1. The product has a relative solution viscosity of 3.1 and a notched impact strength of 41 kJ/m² according to DIN 53 735. The notched impact strength was tested on samples of this product without prior conditioning.

EXAMPLE 3

4400 g of $\epsilon$-caprolactam, 522 g of $\epsilon$-aminocaproic acid, 550 g (10% by weight) of polyethylene and 110 g (2% by weight) of ethylene/acrylic acid copolymers are polycondensed as described in Example 1. With a relative solution viscosity of 3.6, the product had a notched impact strength of 32 kJ/m² according to DIN 53735. The notched impact strength was tested on samples of this product without prior conditioning.

A comparison product prepared by a method analogous to that of Examples 1 to 3 from 7% by weight of polyethylene and 3% by weight of ethylene/acrylic acid copolymers, using as polyethylene a product with a melt index of 6.5 g/10 min (MFI 190/2.16) was found, after it had been worked up into moulded products, to have a notched impact strength of only 8.1 kJ/m² in the unconditioned state.

We claim:

1. Homogeneous polymer mixtures with improved impact strength consisting of
   a. 3 to 30% by weight of a polyethylene having a molecular weight below 100,000 and a melt index of above 15 g/10 min,
   b. a graft polymer of 0.3 to 5% by weight of an ethylene/acrylic acid copolymer or ethylene/methacrylic acid copolymer as graft substrate and grafted polymerised units of ε-caprolactam, and
   c. a poly-ε-caprolactam, in which the quantities of grafted and ungrafted polycaprolactam amount is 65 to 96.7% by weight.

2. Polymer mixtures according to claim 1, containing a polyethylene with a melt index of 17 to 22 g/10 min.

3. Polymer mixtures according to claim 1 in which the polyethylene is a high pressure polethylene.

4. Polymer mixtures according to claim 1 in which the graft polymer (B) contains from 1 to 10 mol percent of acrylic acid or methacrylic acid.

5. Polymer mixtures as claimed in claim 4 in which the graft polymer (B) contains from b 2 to 5 mol percent of acrylic acid or methacrylic acid.

6. Polymer mixtures according to claim 1 in which part of the acrylic acid or methacrylic acid is in the form of its sodium salt.

* * * * *